United States Patent [19]

Cook

[11] 4,089,387
[45] May 16, 1978

[54] ADJUSTABLE RATCHETING WHEEL HUB

[75] Inventor: Harold D. Cook, Urbandale, Iowa

[73] Assignee: Edko Manufacturing Company, Des Moines, Iowa

[21] Appl. No.: 780,424

[22] Filed: Mar. 23, 1977

[51] Int. Cl.² .............................................. B60K 23/04
[52] U.S. Cl. ........................................ 180/76; 192/36; 192/43.1; 192/50
[58] Field of Search .......................... 180/76, 70 R, 638; 192/43.1, 50, 49, 36, 35; 301/124 H, 128

[56] References Cited

U.S. PATENT DOCUMENTS

| 2,123,533 | 7/1938 | Johnston | 301/128 |
| 2,778,467 | 1/1957 | Lewis | 192/50 |
| 3,194,369 | 7/1965 | Witte | 192/45.1 |
| 3,463,280 | 8/1969 | Hoffman et al. | 192/35 |

Primary Examiner—Joseph F. Peters, Jr.
Assistant Examiner—Donn McGiehan
Attorney, Agent, or Firm—Zarley, McKee, Thomte, Voorhees & Sease

[57] ABSTRACT

An adjustable ratcheting wheel hub comprising a reversing pawl driven wheel hub, an axle containing a plurality of pin receiving apertures, a bearing cover assembly, and a hub tube. The hub tube operationally connects the axle to the pawl driver and contains a pin receiving aperture such that the hub tube slidably engages the axle and is secured to the axle by means of a locking pin through the hub tube and axle. The axle contains a plurality of pin receiving apertures and the width between the wheels is varied by selecting the pin receiving axle aperture that corresponds to the desired width.

10 Claims, 5 Drawing Figures

ADJUSTABLE RATCHETING WHEEL HUB

BACKGROUND OF THE INVENTION

This invention relates to ratchet wheel hubs, and more particularly to ratchet wheel hubs used in hand operated garden tractors. While pawl driven ratcheting wheel hubs have been commonly used in garden tractors, there has been no means to adjust the distance between the two tractor wheels to accommodate different distances between rows of plantings necessitated by different types of plants.

SUMMARY OF THE INVENTION

An adjustable ratchet wheel hub is disclosed comprising a pawl driven wheel hub, an axle containing a plurality of pin receiving apertures, a bearing cover assembly and a hub tube operationally connecting the axle to the pawl driven wheel hub. The hub tube slidably engages the axle and is attached thereto by a locking pin through an aperture in the hub tube and one of the apertures in the axle. The distance between the tractor wheels is adjustable by selecting a different pin receiving aperture of the axle to align and pin to the hub tube aperture.

It is a principal object of the invention to provide a ratcheting wheel hub that allows selective variance of the distance between the wheel hubs.

A still further object of the invention is to provide an adjustable wheel hub that allows easy and quick adjustment of the distance between the wheel hub.

A still further object of the invention is to provide an adjustable wheel hub that is sturdy in construction, easy and economical to manufacture and durable in use.

DESCRIPTION OF THE PREFERRED EMBODIMENT

Figures 1, 2:
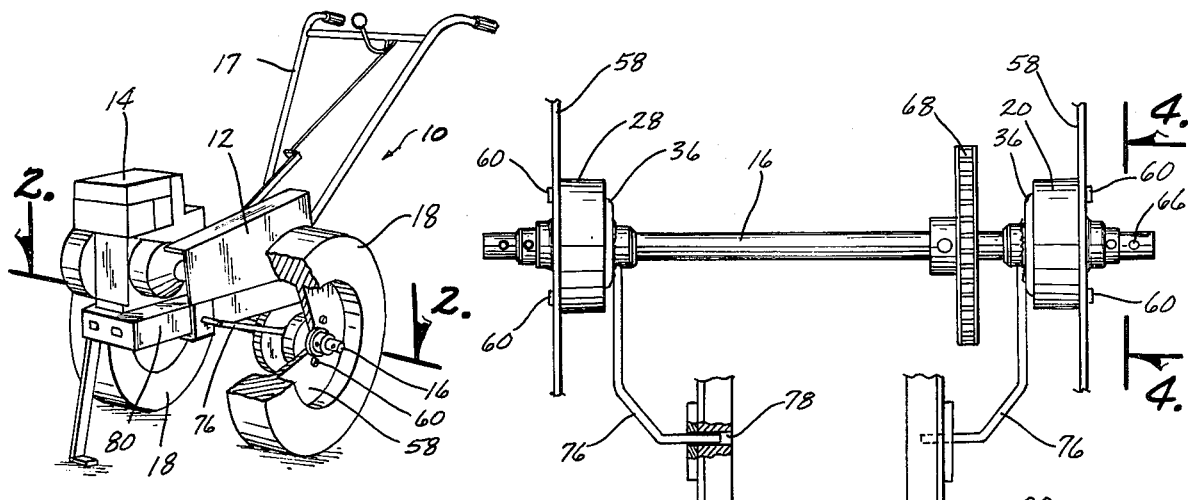
FIG. 1 is a perspective view of the invention mounted in a conventional garden tractor.
FIG. 2 is an enlarged sectional view as seen on line 2-2 of FIG. 1.

The numeral 10 generally refers to a two-wheeled utility tractor comprising frame 12, motor 14, axle 16, handles 17, and drive wheels 18. The wheels 18 are secured to axle 16 by ratcheting wheel hubs 20.

Figure 3:
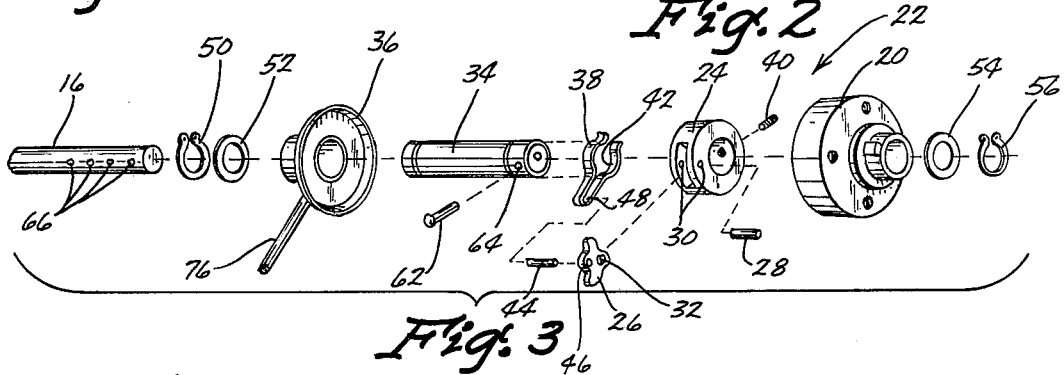
FIG. 3 is an exploded view of the invention.

In FIG. 3, the numeral 22 generally refers to the adjustable ratcheting wheel hub device of this invention.

Figures 4, 5:
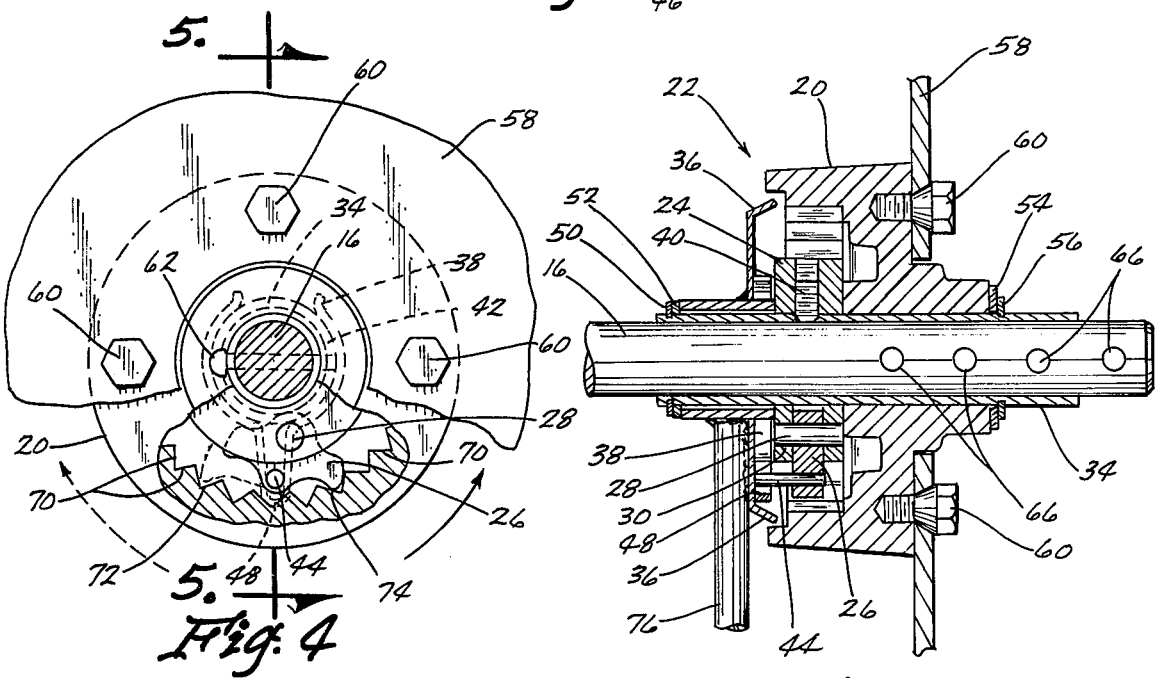
FIG. 4 is a partially broken away enlarged sectional view seen on line 4—4 of FIG. 2.
FIG. 5 is a sectional view seen on line 5—5 of FIG. 4.

The adjustable ratcheting wheel hub 22 as shown in FIG. 3, is generally comprised of a pawl carrier 24, a double end pawl 26, pivotally mounted within carrier 24 by pawl pivot pin 28 being received by carrier aperture 30 and pawl aperture 32, wheel hub 20, and hub tube 34. As shown in FIGS. 3 and 5, hub tube 34 slidably engages bearing cover assembly 36, drag spring 38 pawl carrier 24, and wheel hub 20. Pawl carrier 24 is securely attached to hub tube 34 by means of Allen screw 40. Drag spring 38 is positioned between pawl carrier 24 and bearing cover assembly 36 as shown in FIG. 5. The circular end 42 of drag spring 38 engages hub tube 34 as shown in FIG. 4. Pawl actuating pin 44 is securely mounted within aperture 46 of pawl 26 and is loosely received in the slotted end 48 of drag spring 32 as shown in FIGS. 3 and 4. Bearing cover assembly 36 is held against pawl carrier 24 by arcuate spring clip 50 and washer 52. Wheel hub 20 is similarly held against pawl carrier 24 by washer 54 and arcuate spring clip 56.

The outer circumferential edge of wheel hub 20 contains a continuous ring of inwardly projecting ratchet gear notches for engagement with the end of pawl 26 as shown in FIG. 4. Wheel disc 58 is securely mounted to wheel hub 20 by a standard type lug bolts 60 as shown in FIGS. 4 and 5.

Axle 16 is slidably received by hub tube 34 as shown in FIG. 5 and secured thereto by locking pin 62 passing through aperture 64 of hub tube 34 and aperture 66 of axle 16. Varying the axle aperture receiving the locking pin will accordingly vary the distance between wheel discs 58 as shown in FIG. 2.

In operation, the desired distance between wheels is determined and the corresponding aperture of axle 16 is aligned with aperture 64 of hub tube 34 and secured thereto by locking pin 62.

Rotation is imparted to axle 16 through drive chain means 68. One end of pawl 26 engages ratchet gear notches 70 to drive wheel discs 58 and in turn the wheel attached thereto. When the diretion is to be reversed, the rotation of chain drive means 68 is reversed, thus reversing the rotation of axle 16. Since actuating pin 44 is loosely received by drag spring 38, which is frictionally but yieldably held between pawl carrier 24 and bearing cover assembly 36, the reverse direction of the pawl carrier 24 and the loose holding tendency exerted by drag spring 38 on actuating pin 44 causes pawl 26 to pivot about pivot pin 28. The opposite end of the pawl is then caused to pivot into engagement with ratchet gear notches 70 thereby imparting reverse rotational movement to wheel hub 20, wheel discs 58 and the wheels of the tractor. Engagement of one end of pawl 26 with ratchet gear notches 70 as shown by engagement 72 of FIG. 4 imparts clockwise rotation to the wheel. Engagement of the opposite end of pawl 26 with ratchet gear notches 70 as shown by engagement 74 imparts counter-clockwise rotation to the wheel. The position of bearing cover assembly 36 against drag spring 38 contributes to the frictionally held position and drag characteristic of drag spring 38, and thus must not rotate with the axle. Arm 76 is securely mounted to bearing cover assembly 36 and is slidably received in aperture 78 of a portion 80 of the body of the tractor as shown in FIG. 2. Thus bearing cover assembly 36 remains stationary with respect to the body of the tractor and does not rotate.

To vary the distance between the wheels, locking pin 62 is removed and the axle aperture 66, corresponding to the desired distance, is aligned with aperture 64 of hub tube 34 and is secured thereto with locking pin 62. Arm 76 is of sufficient length to slidably engage aperture 78 of the tractor body for all possible axle length settings. The distance between the wheels is therefore varied in a quick easy manner.

Thus, it can be seen that this invention accomplishes at least all of its stated objectives.

What is claimed is:

1. An improved ratcheting wheel hub having a pawl driven wheel hub, a pawl carrier housing a double end reversing pawl for rotational engagement with said wheel hub, means for reversing rotation of said pawl and said wheel hub, a bearing cover to cover said pawl carrier, and an axle operationally connected to said pawl carrier, wherein the improvement comprises means for selectively detachably mounting said pawl carrier at a plurality of positions on said axle so as to selectively vary the axial distance between two wheels, and means for maintaining said bearing cover in a stationary non-rotational position against said pawl carrier.

2. The device of claim 1 wherein the means for selectively detachably mounting said pawl carrier at a plurality of positions on said axle comprises said axle having a plurality of pin receiving apertures therethrough, a hub tube having a pin receiving aperture and mounted to said pawl carrier and slidably receiving said axle for selective alignment of said hub tube pin receiving aperture with one of said pin receiving axle apertures, and a locking pin for reception by said aligned pin receiving apertures so as to securely mount said hub tube to said axle.

3. The device of claim 2 wherein said locking pin securement is outward from said wheel hub.

4. The device of claim 1 wherein the means for maintaining said bearing cover in a stationary non-rotational position against said pawl carrier comprises an arm outwardly extending from said bearing cover and having first and second ends with said first end securely mounted to said bearing cover and said second end detachably mounted to the vehicle body.

5. The device of claim 4 wherein said second end is detachably mounted to said vehicle body by said second end being slidably received by an aperture in said vehicle body so as to prevent rotation of said bearing cover.

6. The combination of a wheeled tractor comprising a frame, a drive axle rotatably secured to said frame, a power means on said frame operatively secured to said drive axle, wheel drive hubs mounted to the ends of said axle, and wheels secured to said axle, the invention comprising: first means for slidably mounting said drive hub on said axle, second means for selectively locking said drive hubs at predetermined positions on said axle, said drive hub including a bearing cover and a rotatable drive assembly, and means for slidably connecting said bearing cover to said frame and for holding said bearing cover against rotation with said drive assembly.

7. The combination of claim 6 wherein said means connecting said cover to said frame is an elongated arm.

8. The combination of claim 7 wherein said arm slidably extends through an aperture on said frame.

9. The combination of claim 6 wherein said first means for slidably mounting said drive hub on said axle comprises a hub tube securely attached to said drive hub for slidably receiving said axle.

10. The combination of claim 9 wherein said second means for selectively locking said drive hubs at predetermined positions on said axle comprises a plurality of apertures through said axle at predetermined positions, an aperture through said hub tube and a locking pin such that said hub tube aperture is aligned to an axle aperture corresponding to the predetermined position of said drive hubs and said locking pin secures said hub tube to said axle.

* * * * *